Nov. 29, 1938.    J. M. PESTARINI    2,138,667
DIRECT CURRENT COMMUTATING TYPE DYNAMO-ELECTRIC MACHINE
Filed Feb. 2, 1937
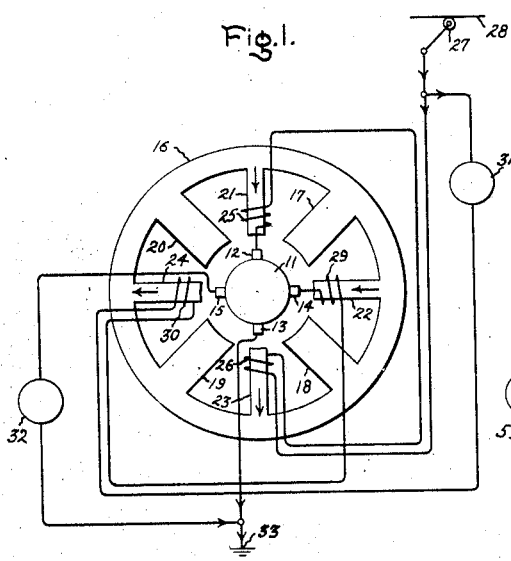
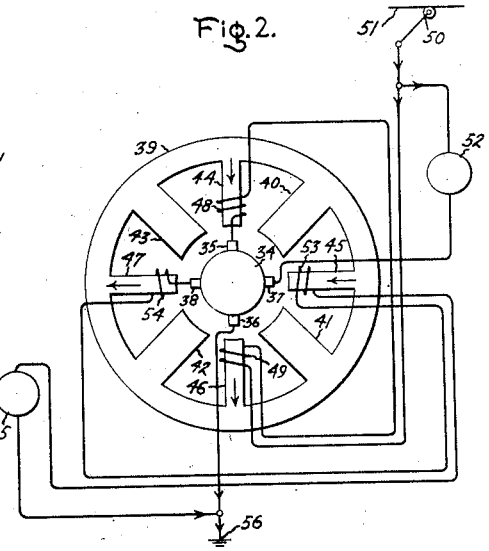
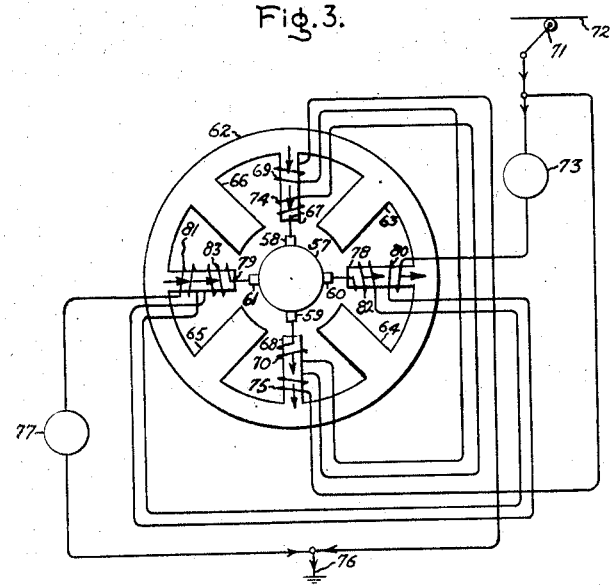
Inventor:
Joseph M. Pestarini,
by Harry E. Dunham
His Attorney.

Patented Nov. 29, 1938

2,138,667

UNITED STATES PATENT OFFICE 2,138,667

DIRECT CURRENT COMMUTATING TYPE DYNAMO-ELECTRIC MACHINE

Joseph M. Pestarini, Turin, Italy

Application February 2, 1937, Serial No. 123,716
In Great Britain January 24, 1934

13 Claims.  (Cl. 172—239)

This is a continuation in part of my application Serial No. 2,536, filed January 19, 1935.

My invention relates to direct current commutating type dynamo-electric machines and, in particular, to generators and rotary transformers of the metadyne type.

A direct current dynamo-electric machine of the metadyne type is a dynamo-electric machine which may be operated as a motor, a generator, or a rotary transformer. Essentially, a metadyne is a direct current dynamo-electric machine having a rotatable member or armature provided with windings and a commutator of the conventional direct current dynamo-electric machine type, and a stationary member affording a path of low magnetic reluctance to the magnetic fluxes set up by the armature currents. The commutator of a metadyne machine provided with four pole pieces usually is provided with two brush sets electrically displaced from each other for providing a primary circuit and a secondary circuit through the metadyne rotatable member or armature. The following description will be made with reference to a metadyne having four pole pieces, but it is equally applicable to metadyne dynamo-electric machines provided with other even numbers of pole pieces. The stationary member of the metadyne also may be provided with various field exciting windings arranged to provide the metadyne with special characteristics or to improve the commutation thereof. In certain applications it has been found desirable to connect part of a load across a primary brush and a secondary brush, and another part of the load across the other primary brush and the other secondary brush. Such an arrangement provides two loop circuits through the metadyne armature, including an external load in each loop, and has been termed an 8 connection.

Commutating poles for a metadyne dynamo-electric machine may be constructed similar to the conventional commutating poles of direct current commutating type dynamo-electric machines. The commutating field exciting windings of the conventional direct current dynamo-electric machine are generally energized by the current carried by the commutator brush of which they are arranged to improve the commutation. In this manner a commutating flux proportional to the current undergoing commutation is obtained for all operating conditions.

It has been found that when a metadyne generator provided with commutating poles has a load connected across its primary and secondary brushes in the figure 8 connection described above, there is a tendency for local loop-circulating parasitic currents to arise. In a direct current commutating type dynamo-electric machine the commutating flux entering the armature from a commutating pole induces equal and opposite voltages in each of the two coil sides, cutting the commutating flux, and, consequently, no net or resultant voltage is generated between the brushes of the dynamo-electric machine. However, since the stationary member of a dynamo-electric machine is generally provided with main pole pieces of low magnetic reluctance arranged between the commutating pole pieces, the commutating flux does not traverse the armature along a path directly from one commutating pole of a given polarity to another commutating pole of opposite polarity, but follows the path of lowest reluctance. This path of lowest magnetic reluctance usually is provided through a main pole piece, and the flux generally travels from a commutating pole piece across the air gap to the armature, through the armature to the next adjacent pole piece of opposite polarity which, as stated above, usually is a main pole piece, through the air gap between the armature and this main pole piece, through the main pole piece to the frame of the stationary member, and then back to the commutating pole. Some of the commutating flux may return by another path, and the voltage induced by this other portion of the commutating flux will counteract or balance out part of the voltage generated by the flux returning to the commutating pole by way of the next adjacent main pole piece of opposite polarity, but it has been found that generally a considerable amount of the commutating flux returns by the path of lowest magnetic reluctance so that a voltage is induced in the armature coils between the brushes, and when a load is connected between the brushes a current will tend to flow therebetween.

In a metadyne dynamo-electric machine constructed symmetrically in all respects, the voltage induced between the brushes by the commutating flux will be exactly equal between any two corresponding brushes. However, it has been found that exact symmetry of construction is never actually obtained, and the resistances of the field exciting windings or those of the parallel armature paths are not exactly the same. All of the air gaps are generally not in exact symmetry, and the reluctances of the various magnetic paths also vary to a certain small degree. Furthermore, varying temperature effects tend to disturb symmetry of the electrical and magnetic circuits of the metadyne dynamo-electric machine. In a metadyne generator or rotary transformer having an external load connected thereto of the figure 8 type, the voltage generated between each of the primary brushes and each of the secondary brushes across which an external load is connected would also be exactly equal and in the same direction in corresponding parts of the circuit, if the metadyne were structurally symmetrical.

In the manufacture of dynamo-electric machines it has been found impossible to obtain perfect symmetry of construction, and the result of numerous slight dissymmetries in the construction of a metadyne dynamo-electric machine to which a load of the figure 8 type is connected, is that unequal voltages are induced between the primary and secondary brushes across which the different external load loops are connected. These non-uniform unequal voltages may be considered as being composed of two components, one component in both loops being in the same direction and of equal magnitude, and the other component being of equal magnitude and opposite in direction in each loop. Thus the unsymmetrical or loop-circulating current may be considered as a component of current which is superimposed upon the normal metadyne load current. It has been found that the unsymmetrical or loop circulating current generally is an alternating component of current. The magnitude of the components of voltage induced by the commutating flux may be readily determined, and the symmetrical component, that is, the component of equal magnitude and same direction in both loops, is equal to one-half of the sum of the two unequal voltages, and the component of equal magnitude and opposite direction in the two loops is equal to one-half the difference between the unequal voltages induced in the two loops. Currents will tend to flow so that a symmetrical component of current will flow in each of the loops having the same magnitude and direction, and another component of current will tend to flow in each loop which will be of equal magnitude in each loop, but which will tend to flow in opposite directions in each of the loops. The symmetrical component of current in the two loops will induce equal voltages in the two armature loops which can be stabilized by the stabilizing field exciting windings, as explained above, but the components of current which flow in opposite directions in the two loops will energize the two poles of a pair of commutating poles in the opposite direction and tend to induce voltages in the opposite sense in each of the two loops. Since these voltages are in opposite directions in the two loops, they will tend to set up local loop-circulating components of current which will tend to heat up the metadyne dynamo-electric machine and decrease its efficiency.

An object of my invention is to provide an arrangement for increasing the efficiency of a direct current metadyne dynamo-electric machine utilized in a system of the type described above, by providing commutating field exciting windings arranged to prevent the generation of the above-mentioned unsymmetrical components of voltage.

Further objects and advantages of my invention will become apparent in the following description referring to the accompanying drawing, and the features of novelty which characterize my invention will be pointed out with particularity in the claims annexed to and forming a part of this specification For a better understanding of my invention reference is made to the accompanying drawing, wherein Fig. 1 illustrates a metadyne dynamo-electric machine provided with primary and secondary commutating field exciting windings, all connected in the same load loop; Fig. 2 illustrates a metadyne dynamo-electric machine provided with primary commutating field exciting windings connected in one load loop, and secondary commutating field exciting windings connected in another load loop; Fig. 3 illustrates a metadyne dynamo-electric machine provided with primary and secondary commutating pole pieces, wherein each primary commutating pole piece is provided with primary commutating field exciting windings connected in the primary circuit of each load loop, and each secondary commutating pole piece is provided with secondary commutating field exciting windings connected in the secondary circuit of each load loop.

Referring to the drawing, I have shown in Fig. 1 a metadyne dynamo-electric machine arranged as a rotary transformer provided with an armature 11 having a primary brush set including primary brushes 12 and 13, and a secondary brush set including brushes 14 and 15 electrically displaced from the primary brush set to provide a primary circuit and a secondary circuit through the armature 11 and having primary and secondary commutating zones, respectively. The metadyne dynamo-electric machine is provided with a stationary member arranged to provide a path of low magnetic reluctance for the fluxes set up by the armature currents, and is provided with a frame 16 and main pole pieces 17, 18, 19 and 20. Commutating pole pieces 21, 22, 23 and 24 are arranged intermediate the main pole pieces. The commutating pole pieces 21 and 23 are arranged to provide a commutating flux for the primary brushes 12 and 13 respectively, and the commutating pole pieces 22 and 24 are arranged to provide a commutating flux for the secondary brushes 14 and 15 respectively. As has been explained above, if voltages of equal magnitude and in the same direction are induced in the armature by each of the primary commutating pole pieces 21 and 23, although these symmetrical voltages may not balance out between brushes, since they are of equal magnitude and in the same direction in corresponding parts of the armature circuit, they can be stabilized by stabilizing field exciting windings. In order to obtain these symmetrical voltages, a uniform component of primary commutating magnetic excitation is provided throughout the primary commutating zone of the primary brushes of equal magnitude and same direction, by the primary commutating pole pieces 21 and 23 which are excited by commutating field exciting windings 25 and 26 respectively. These primary commutating field exciting windings are connected in series with each other between the metadyne primary brush 12 and a line contactor 27, which is connected to a source of electrical power supply 28. In this manner, both of the primary commutating field exciting windings are energized to the same extent by the current in the primary circuit of the load loop including the motor 31, and thereby provide the desired uniformity in the primary commutating flux. Since the loads which are connected in the figure 8 connection to a metadyne generally are substantially equal, the primary currents carried by the two brushes of the primary brush set generally are substantially equal. Therefore, the primary current carried by one of the primary brushes will energize the primary commutating field exciting windings, so as to provide a commutating flux substantially proportional to the current carried by each of the primary brushes and thereby provide the required commutating flux for each primary brush.

Similarly, the secondary commutating pole pieces 22 and 24 are provided with secondary commutating field exciting windings 29 and 30 respectively, which are connected in series with each other between the metadyne secondary brush 14 and the load loop including the motor 31. In this manner, both of the secondary commutating field exciting windings are energized to the same extent by the secondary current in the secondary circuit of the load loop including the motor 31, and provide a uniform component of secondary commutating magnetic excitation of equal magnitude and same direction throughout the secondary commutating zone of the secondary brushes, thereby inducing symmetrical voltages in both load loops, which can be stabilized by the stabilizing field exciting winding arrangements disclosed in my United States Letters Patent 2,038,384 of April 21, 1936. The other load loop of the figure 8 connection includes a motor 32 which is connected between the metadyne secondary brush 15 and the metadyne primary brush 13, and to ground 33. The arrows shown on the lines forming the load loops indicate the direction of the load current under normal operating conditions, and the arrows on the commutating pole pieces indicate the direction of the commutating fluxes under the same conditions.

In the arrangement shown in this figure, the uniform primary commutating flux and the uniform secondary commutating flux are obtained by commutating field exciting windings all of which are connected in the same loop. This is not essential, however, as the essential feature is that all of the primary commutating pole field exciting windings are energized by exactly the same primary current, and all of the secondary commutating pole field exciting windings are energized by the same secondary current. This insures a uniformity of primary commutating flux to all of the primary commutating pole pieces, and a uniformity of secondary commutating flux to all of the secondary commutating pole pieces, since, in this manner, all of the primary commutating pole pieces are excited to the same extent and all of the secondary commutating pole pieces are excited to the same extent. Dissymmetries in the metadyne circuits which would tend to generate unequal voltages in the armature circuits of the figure 8 connection will be ineffective in inducing such unequal voltages, as the excitation provided by the commutating poles will remain equal under all operating conditions.

Fig. 2 illustrates another embodiment of my invention, wherein a metadyne rotary transformer is provided with an armature 34 having a primary brush set including brushes 35 and 36, and a secondary brush set including brushes 37 and 38, electrically displaced from the primary brush set to provide a primary circuit and a secondary circuit through the armature 34 and having primary and secondary commutating zones, respectively. The metadyne transformer is provided with a stationary member including a frame 39 and main pole pieces 40, 41, 42, and 43. Commutating pole pieces 44, 45, 46 and 47 are arranged intermediate the main pole pieces 40, 41, 42 and 43. The commutating pole pieces 44 and 46 are arranged to provide a commutating flux for the primary brushes 35 and 36 respectively, and are energized by primary commutating field exciting windings 48 and 49 respectively, which are connected in series with each other between the metadyne primary brush 35 and a line contactor 50 connected to a source of electrical power supply 51. In this manner, all of the primary commutating pole pieces are excited to the same extent by the primary current of one of the load loops, including a motor 52. The circuit of the load loop including the motor 52 is completed between the metadyne primary brush 35 and the metadyne secondary brush 37. The secondary commutating pole pieces 45 and 47 are excited by secondary commutating field exciting windings 53 and 54 respectively, connected in series with each other in the secondary circuit of a load loop including a motor 55. The circuit of the load loop including the motor 55 is completed between the metadyne secondary brush 38 and the metadyne primary brush 36 to ground 56. As shown in this figure, although the primary commutating field exciting windings and the secondary commutating field exciting windings are not connected in the same loop, they provide a uniform primary and a uniform secondary commutating field excitation, and therefore have no tendency to generate unequal voltages in the two armature loop circuits. As has been explained with respect to Fig. 1, any tendency for the generation of voltages in the armature conductors included between the brushes forming the two loop circuits will be equal and in the same direction, and consequently such voltages can be compensated by stabilizing field exciting windings arranged on the main pole pieces.

In Fig. 3, I have shown a further embodiment of my invention, wherein a more symmetrical construction of the metadyne dynamo-electric machine than that shown in Figs. 1 and 2 is obtained by providing each of the primary commutating pole pieces with a primary commutating field exciting winding connected in the primary circuit of each of the load loops, and by providing each of the secondary commutating pole pieces with a secondary commutating field exciting winding connected in the secondary circuit of each of the load loops. As in the conventional metadyne dynamo-electric machine, the metadyne transformer shown in this figure is provided with an armature 57 having a primary brush set including primary brushes 58 and 59, and a secondary brush set including secondary brushes 60 and 61 electrically displaced from the primary brushes to provide a primary circuit and a secondary circuit through the armature 57 and having primary and secondary commutating zones, respectively. The stationary member of the metadyne transformer is provided with a frame 62, and main pole pieces 63, 64, 65 and 66 arranged intermediate the commutating zones of the armature. The excitation of the metadyne transformer along the primary commutating zone is provided by primary commutating pole pieces 67 and 68 which are excited by primary commutating field exciting windings 74 and 75 respectively, connected in series with each other between the metadyne primary brush 58 and a line contactor 71 connected to a source of electrical power supply 72. In this manner, both of the primary commutating pole pieces 67 and 68 are excited by a field exciting winding connected in the primary circuit of one of the load loops, including a motor 73. The primary commutating pole pieces 67 and 68 also are excited by primary commutating field exciting windings 69 and 70 respectively, connected in series with each other between the metadyne primary brush 59 and ground 76. These two primary commutating field exciting windings are, therefore, connected in the primary circuit of the other load loop, including a motor 77. Thus, each of the primary commutating pole pieces is excited by a field exciting winding energized by the primary current carried by the primary brush in its respective commutating zone, and also excited by a primary commutating field exciting winding energized by the primary current carried by the primary brush which is connected in the other load loop and arranged in the other portion of the primary commutating zone. The secondary commutating zones of the metadyne are excited by a commutating flux provided by secondary commutating pole pieces 78 and 79. These pole pieces are excited by secondary commutating field exciting windings 80 and 83 respectively, connected in series with each other between the metadyne secondary brush 61 and the load loop, including the motor 73. The pole pieces 78 and 79 also are excited by secondary commutating field exciting windings 82 and 81 respectively, connected in series with each other between the metadyne secondary brush 60 and the load loop, including the motor 77. In this manner, each of the secondary commutating pole pieces is provided with a commutating field exciting winding energized by the secondary current carried by its respective brush, and also excited by a secondary commutating field exciting winding energized by the current carried by the secondary brush connected to the other load loop. All of the commutating field exciting windings on each commutating pole piece are arranged to provide a commutating flux in the same direction when energized by normal load currents, so that the resultant excitation of any commutating pole piece is the sum of the excitation produced by all of the commutating field exciting windings which excite the commutating pole piece. Such an arrangement provides a uniform symmetrical primary commutating flux throughout the primary commutating zone and a uniform symmetrical secondary commutating flux throughout the secondary commutating zone, and, furthermore, provides balanced resistances in the primary and secondary commutating circuits of each load loop, and in this manner further insures against the generation of non-uniform unequal voltages between the brushes connected to the different load loops by providing a more symmetrical metadyne structure.

Modifications of the circuit arrangements which I have disclosed will occur to those skilled in the art. I desire it to be understood, therefore, that my invention is not to be limited to the particular embodiments disclosed, and I intend in the appended claims to cover all modifications which do not depart from the spirit and scope of my invention.

What I claim as new and desire to secure by Letters Patent of the United States, is:

1. A metadyne dynamo-electric machine provided with a stationary member and an armature having winding conductors and a commutator connected thereto, means including a primary brush set and a secondary brush set associated with said commutator for providing a primary circuit having a primary commutating zone and a secondary circuit having a secondary commutating zone respectively in said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, and means for producing a substantially uniform and equal magnetic excitation along each respective commutating zone of said armature.

2. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, and means for maintaining symmetrical and equal electromotive forces in said armature across each of said load loops.

3. A metadyne dynamo-electric machine provided with a stationary member and an armature having winding conductors and a commutator connected thereto, means including a primary brush set and a secondary brush set associated with said commutator for providing a primary circuit having a primary commutating zone and a secondary circuit having a secondary commutating zone respectively in said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, and means arranged to produce a substantially uniform and equal magnetic excitation along each of said respective commutating zones of said armature for maintaining in said armature substantially equal and symmetrical electromotive forces across each of said load loops.

4. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, a field exciting winding arranged to produce a component of magnetic excitation along the commutating axis of said primary brush set, a second field exciting winding arranged to produce a component of magnetic excitation along the commutating axis of said secondary brush set, and means arranged to energize each of said field exciting windings for providing a substantially equal and uniform component of excitation along the commutating zone of each respective brush set.

5. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, a field exciting winding arranged to produce a component of magnetic excitation along the commutating zone of said primary brush set, a source of electrical power supply, means connecting said field exciting winding between said source of electrical power supply and a brush of said primary brush set for providing a substantially equal and uniform component of magnetic excitation along the commutating zone of said primary brush set, a second field exciting winding arranged to produce a component of magnetic excitation along the commutating zone of said secondary brush set, and means connecting said second field exciting winding between one of said electrical loads and a brush of said secondary brush set for providing a substantially equal and uniform component of excitation along the commutating zone of said secondary brush set.

6. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, a set of field exciting windings arranged to produce a component of magnetic excitation along the commutating zone of each brush of said primary brush set, means for connecting said set of field exciting windings in the primary circuit of one of said load loops, a second set of field exciting windings arranged to produce a component of magnetic excitation along the commutating zone of each brush of said secondary brush set, and means for connecting said second set of field exciting windings in the secondary circuit of said one of said load loops.

7. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, commutating pole pieces, and means dependent upon the current in both of said electrical loads arranged to excite said pole pieces for providing a substantially equal and uniform magnetic excitation along the commutating zone of each of said respective primary and secondary brush sets.

8. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, a set of field exciting windings arranged to produce a component of magnetic excitation along the commutating zone of each brush of said primary brush set, means for connecting said set of field exciting windings in the primary circuit of one of said load loops, a second set of field exciting windings arranged to produce a component of magnetic excitation along the commutating zone of each brush of said secondary brush set, and means for connecting said second set of field exciting windings in the secondary circuit of the other of said load loops.

9. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, and means dependent upon the electric current in each of said loads for providing a substantially equal and uniform component of magnetic excitation along each of the respective commutating zones of said primary and secondary brush sets.

10. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, and means including a field exciting winding energized in accordance with the current in the primary circuit of said first-mentioned electrical load and a second field exciting winding energized in accordance with the current in the primary circuit of said second electrical load for providing a uniform component of magnetic excitation along the commutating axis of said primary brush set.

11. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, a set of field exciting windings arranged to produce a component of magnetic excitation along the commutating zone of each brush of said primary brush set, means for connecting said set of field exciting windings in the primary circuit of one of said load loops, a second set of field exciting windings arranged to produce a component of magnetic excitation along the commutating zone of each brush of said primary brush set, means for connecting said second set of field exciting windings in the primary circuit of the other of said load loops, a third set of field exciting windings arranged to produce a component of magnetic excitation along the commutating zone of each brush of said secondary brush set, and means for connecting said third set of field exciting windings in the secondary circuit of one of said load loops.

12. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, a set of field exciting windings arranged to produce a component of magnetic excitation along the commutating zone of each brush of said primary brush set, means for connecting said set of field exciting windings in the primary circuit of one of said load loops, a second set of field exciting windings arranged to produce a component of magnetic excitation along the commutating zone of each brush of said secondary brush set, means for connecting said second set of field exciting windings in the secondary circuit of said one of said load loops, a third set of field exciting windings arranged to produce a component of magnetic excitation along the commutating zone of each brush of said secondary brush set, and means for connecting said third set of field exciting windings in the secondary circuit of the other of said load loops.

13. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, a set of field exciting windings arranged to produce a component of magnetic excitation along the commutating zone of each brush of said primary brush set, means for connecting said set of field exciting windings in the primary circuit of one of said load loops, a second set of field exciting windings arranged to produce a component of magnetic excitation along the commutating zone of each brush of said primary brush set, means for connecting said second set of field exciting windings in the primary circuit of the other of said load loops, a third set of field exciting windings arranged to produce a component of magnetic excitation along the commutating zone of each brush of said secondary brush set, means for connecting said third set of field exciting windings in the secondary circuit of said one of said load loops, a fourth set of field exciting windings arranged to produce a component of magnetic excitation along the commutating zone of each brush of said secondary brush set, and means for connecting said fourth set of field exciting windings in the secondary circuit of said other of said load loops.

JOSEPH M. PESTARINI.